United States Patent
Sakuragi et al.

(10) Patent No.: US 8,847,509 B2
(45) Date of Patent: Sep. 30, 2014

(54) LIGHT-EMITTING DIODE DRIVING APPARATUS INCLUDING CHARGING/DISCHARGING CAPACITOR

(75) Inventors: Harumi Sakuragi, Tokushima (JP); Wataru Ogura, Okaya (JP); Teruo Watanabe, Okaya (JP)

(73) Assignee: Nichia Corporation, Anan-shi (JP)

( * ) Notice: Subject to any disclaimer, the term of this patent is extended or adjusted under 35 U.S.C. 154(b) by 298 days.

(21) Appl. No.: 13/478,116

(22) Filed: May 23, 2012

(65) Prior Publication Data
US 2012/0299495 A1 Nov. 29, 2012

(30) Foreign Application Priority Data

May 24, 2011 (JP) .................. 2011-116389

(51) Int. Cl.
*H05B 37/02* (2006.01)
(52) U.S. Cl.
CPC .............. *H05B 37/02* (2013.01); *Y02B 20/341* (2013.01)
USPC ............................ 315/291; 315/235; 315/238
(58) Field of Classification Search
CPC ..................................................... H05B 37/02
USPC ............. 315/200 R, 229, 235, 238, 272–273, 315/275, 279, 291, 297, 300, 302, 352–353
See application file for complete search history.

(56) References Cited

U.S. PATENT DOCUMENTS

| 7,952,294 B2 * | 5/2011 | Shteynberg et al. ........... 315/224 |
| 2011/0260639 A1 * | 10/2011 | Kim .............................. 315/291 |

FOREIGN PATENT DOCUMENTS

| CN | 101710722 | 5/2010 |
| CN | 201766755 U | 3/2011 |
| JP | 2006-147933 | 6/2006 |

OTHER PUBLICATIONS

Chinese Office Action for corresponding CN Application No. 201210158044.8, Apr. 29, 2014.

* cited by examiner

*Primary Examiner* — Douglas W Owens
*Assistant Examiner* — Henry Luong
(74) *Attorney, Agent, or Firm* — Mori & Ward, LLP

(57) ABSTRACT

A charging diode 6 is connected to the capacitor 3 and the anode of a first LED 11, and limits the direction of the charging current. A discharging diode 7 is connected to the capacitor 3 and the cathode of the first LED 11, and limits the direction of the discharging current. A charging path CP is provided which includes the capacitor 3, the charging diode 6, and the charger 5. The capacitor 3 is charged through the charging path CP. A discharging path DP is provided which includes the capacitor 3, the discharging diode 7 and a discharger 4. The capacitor 3 is discharged through the discharging path DP. A transient path TP is provided which does not include the capacitor 3 but includes the first LED 11, the charger 5 and the discharger 4.

7 Claims, 18 Drawing Sheets

LIGHT-EMITTING DIODE DRIVING APPARATUS INCLUDING CHARGING/DISCHARGING CAPACITOR

BACKGROUND OF THE INVENTION

1. Field of the Invention

The present invention relates to a driving circuit which drives a light emitting diode(s), and in particular to a light-emitting diode driving apparatus which drives a light emitting diode(s) by using AC power supply.

2. Description of the Related Art

In recent years, significant attention is given to light-emitting diodes (hereinafter, occasionally referred to as "LEDs") as lighting sources. The reason is that LEDs can be driven at low power consumption as compared with filament lamps or fluorescent lamps. LEDs are small, and have shock resistance. In addition, LEDs are less prone to blow out. Thus, LEDs have these advantages. In the case of lighting sources, it is desirable that commercial AC power for home use is used as power supply for lighting sources. LEDs are devices driven by DC power. LEDs emit light only when applied with a current in the forward direction. Also, in the case of LEDs that are currently typically used for lighting use, the LEDs operate on DC power at a forward directional voltage $V_f$ of about 3.5 V. LEDs do not emit light if a voltage applied to the LEDs does not reach $V_f$. Conversely, a voltage applied to the LEDs exceeds $V_f$, an excessive amount of current will flow through the LEDs. Accordingly, it can be said that DC power is suitable for driving LEDs.

In the case where LEDs are driven for light emission by using AC power supply, an AC current is typically converted into a DC current by a switching power supply so that the converted current is applied to the LEDs. However, in this construction, circuit elements such as coil and capacitor are required. Accordingly, a large power supply is required. As a result, this construction will be expensive. For this reason, various types of driving apparatuses have been proposed to drive LEDs with a pulsating current which is rectified a current from AC power supply by a diode bridge without using switching power supply.

FIG. 19 shows a circuit diagram of a constant current LED driving circuit which has been developed by the inventors and uses two transistors, for example. The constant current LED driving circuit includes commercial power AP, a rectifying circuit 92 which is composed of a diode bridge, an LED portion 91, and a constant current circuit which includes two transistors 93 and 94 and resistors 95 and 96. The LED portion 91 includes a plurality of LED devices, which are serially connected to each other. In this constant current LED driving circuit, in the case where the sum of $V_f$ values (hereinafter, occasionally simply referred to as $V_f$) of the plurality of LED devices is low, the loss of the constant current circuit will be large which is caused by the voltage difference between $V_f$ and the peak of rectified pulsating voltage (141 V in Japan). As a result, in this case, the power supply efficiency of the constant current LED driving circuit will be low. On the other hand, in the case where the sum of $V_f$ values is high, the voltage range wil be narrow where the LED portion can be driven. As a result, the LED light ON period will be short in one cycle. In addition, in the case where the sum of $V_f$ values is set high, the number of the serially-connected LED devices is necessarily increased. As a result, while the cost will be high, the LED usage efficiency will be low, in other words, (LED effective power consumption)/(power consumption of LED driven at rated DC current) will be low. FIG. 20 is a graph showing this relationship. In this graph, the horizontal axis indicates the sum value of $V_f$ values of the LED devices which are driven at a constant current. The left-side vertical axis indicates the power supply efficiency and the driving efficiency, while the right-side vertical axis indicates the crest factor. As seen from this graph, the power supply efficiency decrease with the decrease of the sum of $V_f$ values, while the driving efficiency decreases with the increase of the sum of $V_f$ values. For this reason, they are mutually contradictory.

In addition, the constant current LED driving circuit has a light OFF period where the LEDs are brought OFF in synchronization with power supply frequency. This may deteriorate lighting quality. The crest factor (=maximum value/effective value) is well known as objective index. In this case, the light output values are measured to obtain the crest factor. The aforementioned constant current driving circuit shown in FIG. 19 has a crest factor=about 1.7 in the case of the sum of $V_f$ values=120 V. This crest factor is larger than filament lamp, fluorescent lamp and inverted fluorescent lamp, which have crest factors of about 1.05, 1.36 and 1.1, respectively. This means that some people may perceive flicker. In case where the LEDs are lighting a rotating body, if the power supply frequency matches with the rotating frequency, it may perceived that rotating body is stopped even though it rotates (stroboscope phenomenon). To avoid this, it is conceivable that a large-capacitance capacitor is used for smoothing the pulsating current. However, in this case, the power factor may be reduced by a quick charge current flowing into the capacitor. Also, an inrush current may be produced when the power supply is connected.

As discussed above, in the case where AC power supply is used, if the LEDs are driven with the pulsating current after rectification, it is not easy to achieve a good balance between power supply efficiency, power factor, LED usage efficiency and light output crest factor. As can be seen from FIG. 20, the power supply efficiency and the LED usage efficiency have a tradeoff relationship with each other. For this reason, it is necessary to find an appropriate balance (in other words, to make an appropriate compromise) between the power supply efficiency and the LED usage efficiency. On the other hand, in order to improve the light output crest factor, the light ON period may be increased by discharging the capacitor. In this case, although the LED usage efficiency can be improved, the power factor will be reduced by the charging current of the capacitor.

See Japanese Patent Laid-Open Publication No. JP 2006-147,933 A.

The present invention is devised to solve the above problems. It is a main object of the present invention to provide a light-emitting diode driving apparatus which can surely has both a good crest factor and a good driving efficiency.

SUMMARY OF THE INVENTION

To achieve the above object, a light-emitting diode driving apparatus according a first aspect of the present invention, includes a rectifying circuit 2 includes a first LED section 11, a charging/discharging capacitor 3, a capacitor charging constant current circuit 5, a charging diode 6, a capacitor discharging constant current circuit 4, and a discharging diode 7. The rectifying circuit 2 can be connected to AC power supply AP and rectifies an AC voltage of the AC power supply AP to provide a rectified voltage. The first LED section 11 includes at least one LED device connected to the output-side of the rectifying circuit 2. The charging/discharging capacitor 3 is serially connected to the first LED section 11. The capacitor charging constant current circuit 5 controls a capacitor charging current so that the charging/discharging capacitor 3 is charged at a constant current. The charging diode 6 is connected to the charging/discharging capacitor 3 and the anode side of the first LED section 11, and limits the direction of the capacitor charging current. The capacitor discharging constant current circuit 4 controls a capacitor discharging current so that the charging/discharging capacitor 3 is discharged at a constant current. The discharging diode 7 is connected to the charging/discharging capacitor 3 and the cathode side of the first LED section 11, and limits the direction of the capacitor discharging current. A charging path CP, a discharging path DP and a transient path TP are provided. The charging path CP includes the charging/discharging capacitor 3, the charging diode 6 and the capacitor charging constant current circuit 5. The charging/discharging capacitor 3 can be charged through the charging path CP. The discharging path DP includes the charging/discharging capacitor 3, the discharging diode 7 and the capacitor discharging constant current circuit 4. The charging/discharging capacitor 3 can be discharged through the discharging path DP. The transient path TP does not include the charging/discharging capacitor 3 but includes the first LED section 11, the capacitor charging constant current circuit 5 and the capacitor discharging constant current circuit 4. According to this construction, since the first LED section is connected on the charging path not only in the discharging period but also in the charging period, the first LED section can emit light in both the charging and discharging periods. As a result, the light ON period of the first LED section can be longer. Therefore, it is possible to improve the driving efficiency.

In a light-emitting diode driving apparatus according a second aspect of the present invention, the charging and discharging diodes 6 and 7 can be connected to the both ends of the first LED section 11. The charging and discharging diodes 6 and 7 can be connected in parallel to each other. According to this construction, the charging and discharging paths are separately formed, while the first LED section is connected both on the charging and discharging paths. As a result, the first LED section can emit light both in the charging and discharging periods.

In a light-emitting diode driving apparatus according a third aspect of the present invention, the charging path CP can further include a second LED section 12. According to this construction, the number of the LED sections can be increased which are held light ON in the charging period.

In a light-emitting diode driving apparatus according a fourth aspect of the present invention, the discharging path DP can further include a third LED section 13. According to this construction, the number of the LED sections can be increased which are held light ON in the discharging period.

In a light-emitting diode driving apparatus according a fifth aspect of the present invention, charging and discharging paths CP and DP can further include second and third LED sections 12 and 13, respectively. According to this construction, it is possible to improve the power supply efficiency and to provide higher flexibility to set the LED voltage $V_f$ values.

In a light-emitting diode driving apparatus according a sixth aspect of the present invention, the number of LED devices which emit light in a transient period can be greater than the number of LED devices which emit light at the peak of the rectified voltage. According to this construction, the light emission amount can be suppressed when the input voltage is high, in particular, at the peak of the input voltage where the light emission amount will be the highest in conventional light-emitting diode driving apparatuses, while the light emission amount can be increased in the transient period where the input voltage is low. As a result, the light amount can be even. Therefore, it is possible to improve the crest factor.

In a light-emitting diode driving apparatus according a seventh aspect of the present invention, the amount of a current can be greater which is applied to LED devices at the peak of the rectified voltage than the amount of a current which is applied to LED devices in a transient period. According to this construction, even in the case where the number of LED devices is small which emit light at the peak, the light emission amount of each of the LED devices can be held by a higher amount of current. Therefore, the light emission amount is not reduced too much at the peak.

The above and further objects of the present invention as well as the features thereof will become more apparent from the following detailed description to be made in conjunction with the accompanying drawings.

DETAILED DESCRIPTION OF THE EMBODIMENT(S)

Figure 1:
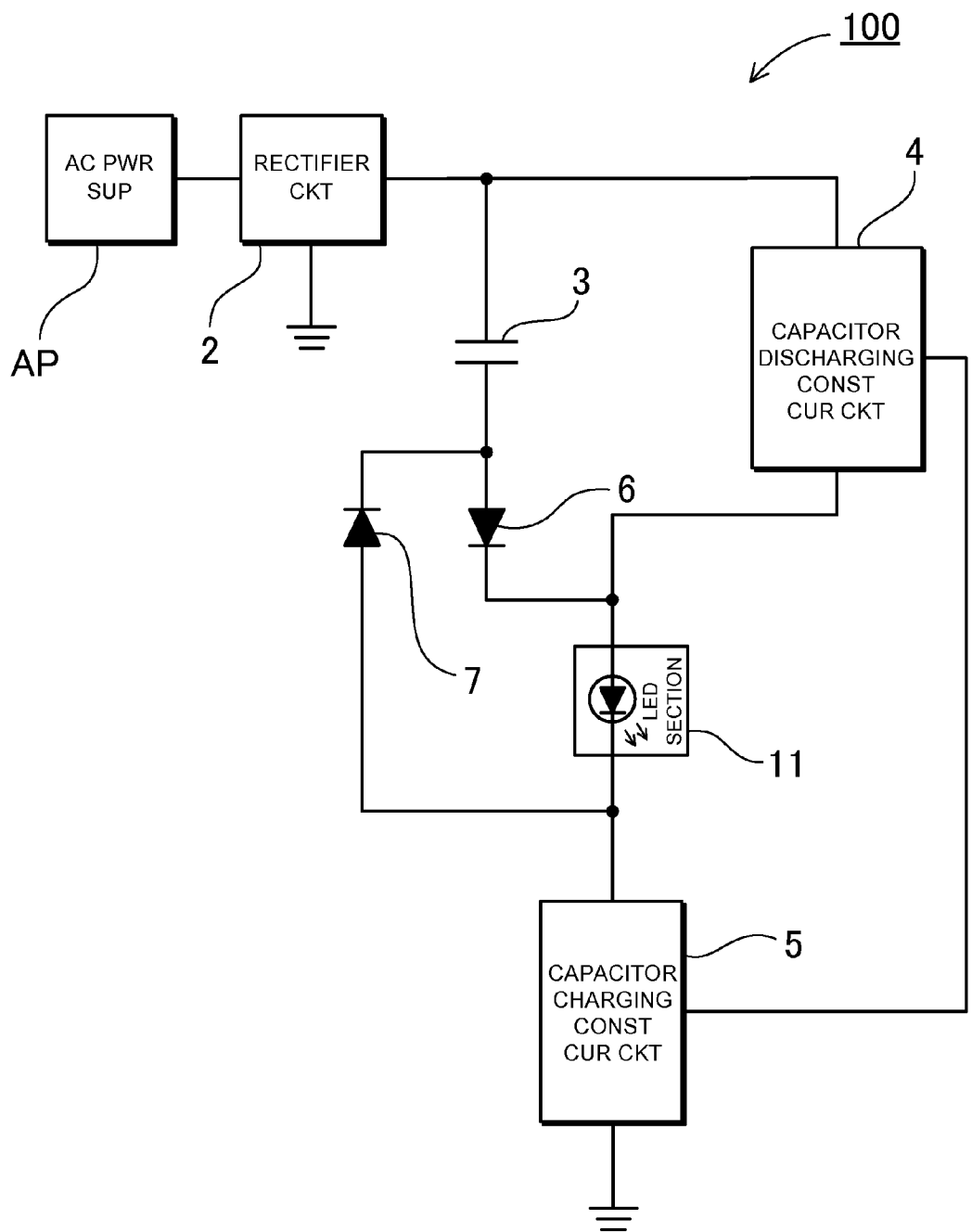
FIG. 1 is a block diagram showing a light-emitting diode driving apparatus according to a first embodiment.

The following description will describe embodiments according to the present invention with reference to the drawings. It should be appreciated, however, that the embodiments described below are illustrations of a light-emitting diode driving apparatus used therein to give a concrete form to technical ideas of the invention, and a light-emitting diode driving apparatus of the invention is not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown larger exaggeratingly for ease of explanation. Members same as or similar to those of this invention are attached with the same designation and the same reference numerals, and their description is omitted. In addition, a plurality of structural elements of the present invention may be configured as a single part that serves the purpose of a plurality of elements, on the other hand, a single structural element may be configured as a plurality of parts that serve the purpose of a single element. Also, the description of some of examples or embodiments may be applied to other examples, embodiments or the like.

First Embodiment

FIG. 1 is a block diagram showing a light-emitting diode driving apparatus 100 according to a first embodiment of the present invention. The light-emitting diode driving apparatus 100 includes a rectifying circuit 2, a first LED section 11, a capacitor charging constant current circuit 5, a capacitor discharging constant current circuit 4, a charging diode 6, a discharging diode 7, and a charging/discharging capacitor 3. The light-emitting diode driving apparatus 100 is connected to AC power supply AP. The rectifying circuit 2 rectifies AC voltage and provides the rectified voltage (pulsating voltage). In addition, a fuse 81 or a surge protection circuit for preventing an over-current flow or a surge voltage can be connected between the AC power supply AP and the rectifying circuit 2.

The LED section is a block which includes one LED device or a plurality of LED devices which are connected to each other in series and/or in parallel. Surface-mount type LEDs (SMDs) or bullet type LEDs can be suitably used for the LED devices. SMD type LED devices can have packages with various external shapes, such as a rectangular shape in plan view, depending on applications. Needless to say, a plurality of LED devices can be connected to each other in series and/or in parallel inside an LED package as the LED section.

A subtotal forward directional voltage is determined by the number of the LED devices which are connected to each other in series in an LED section. For example, in the case where sixth LED devices are employed that have a forward directional voltage of 3.6 V, the subtotal forward directional voltage of the six LED devices will be 3.6×6=21.6 V.

Figure 2:
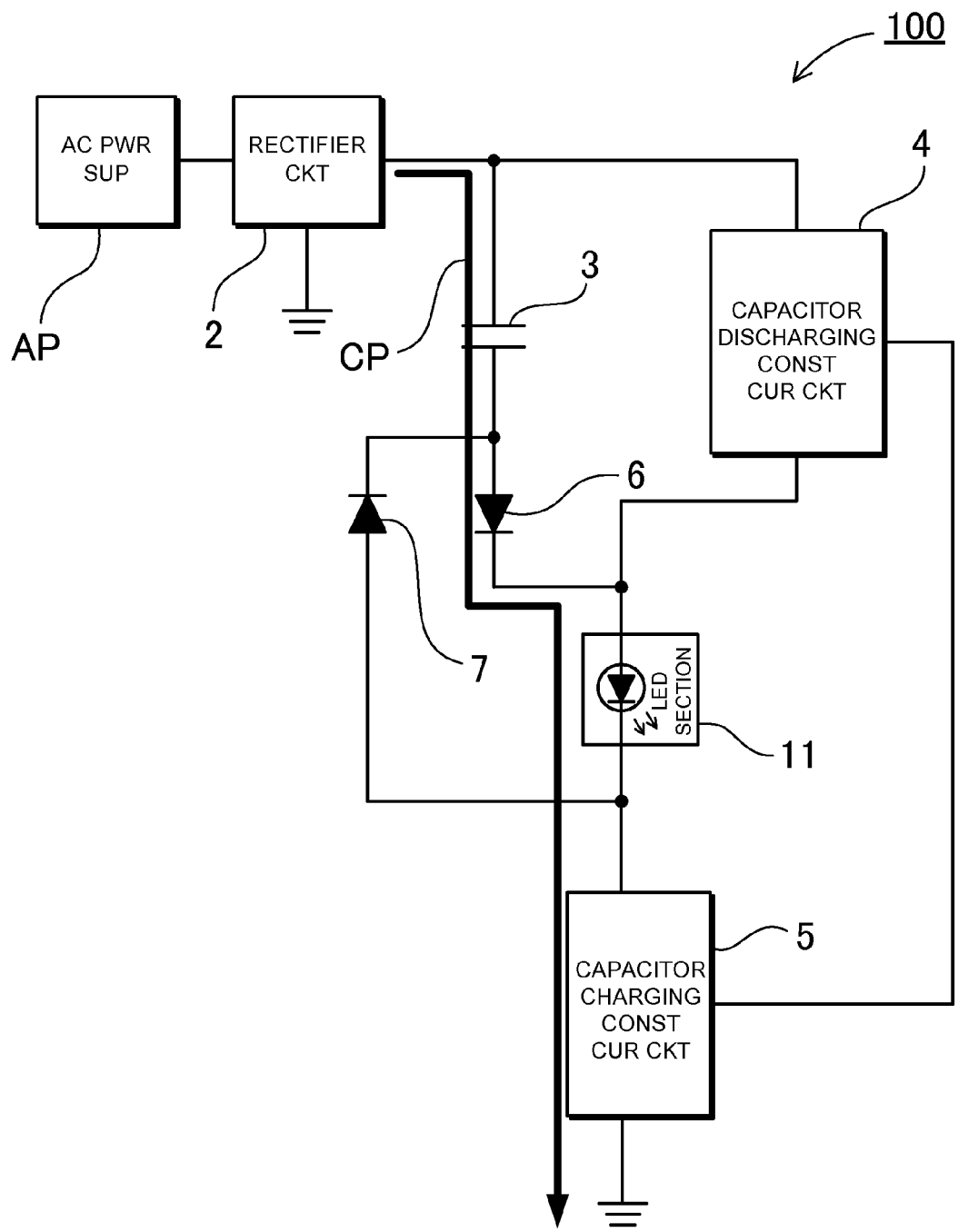
FIG. 2 is a block diagram showing a current path in a capacitor charging period in the light-emitting diode driving apparatus shown in FIG. 1.
Figure 3:
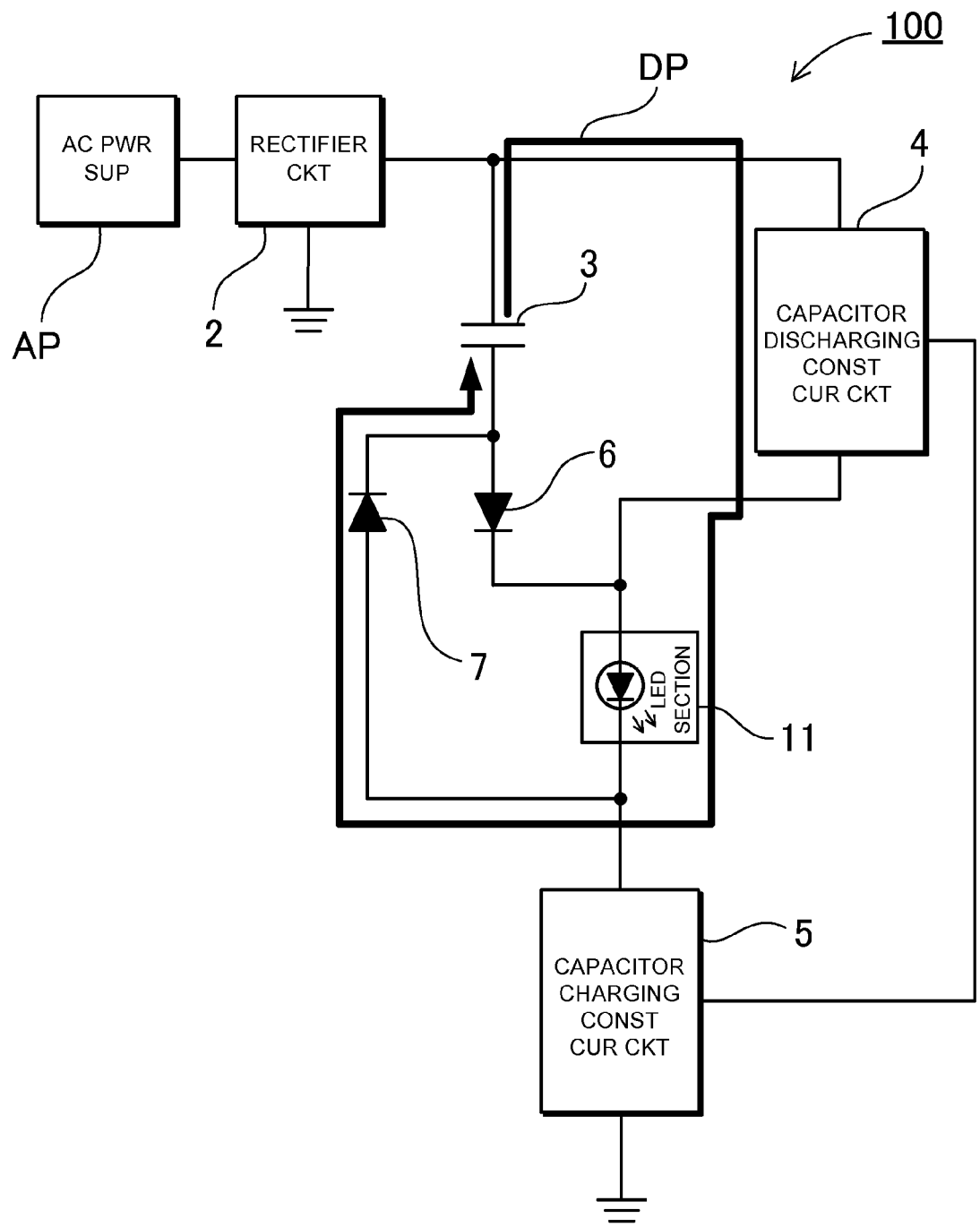
FIG. 3 is a block diagram showing a current path in a capacitor discharging period in the light-emitting diode driving apparatus shown in FIG. 1.
Figure 4:
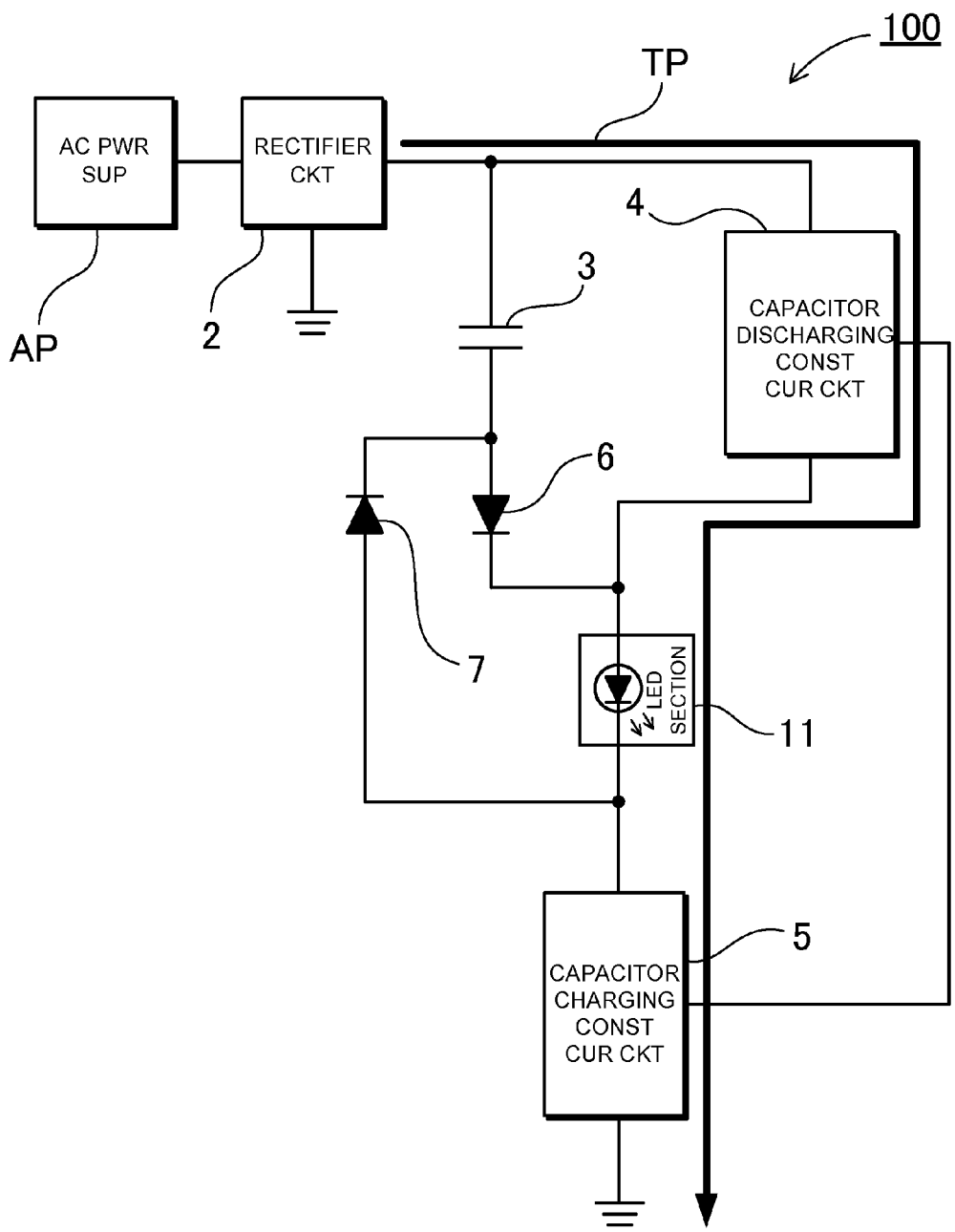
FIG. 4 is a block diagram showing a current path in a transient period in the light-emitting diode driving apparatus shown in FIG. 1.

The light-emitting diode driving apparatus 100 includes a charging path CP and a discharging path DP for charging and discharging the charging/discharging capacitor 3. FIG. 2 shows a current path (charging path CP) in a charging period where the charging/discharging capacitor 3 is charged in the circuit shown in FIG. 1. FIG. 3 shows a current path (discharging path DP) in a discharging period. FIG. 4 shows a current path (transient path TP) in a transient period. The following description will describe the operation of the circuit shown in FIG. 1.

(Charging Path CP)

The charging/discharging capacitor 3 is first charged in the period where the power supply voltage of AC power supply AP is high. A charging current flows, as shown by the arrow in FIG. 2, so that the charging/discharging capacitor 3 is charged with the charging current being adjusted to a constant current by the charging constant current circuit 5. At this charging operation, the first LED section 11 and the charging/discharging capacitor 3 are serially connected to each other. Accordingly, even in the case where the sum of $V_f$ values of the first LED section 11 is low and the voltage difference between the sum of $V_f$ values and the power supply voltage is large, the loss of the charging constant current circuit 5 can be suppressed by the charging voltage of the charging/discharging capacitor 3. The charging voltage applied to the charging/discharging capacitor 3 will reach a voltage $V_{c+}$ which is obtained by subtracting the sum of $V_f$ values of the first LED section 11 from a power supply voltage $V_{che}$ at the charging operation end. The discharging current can flow in accordance with the voltage difference between this charging voltage $V_{c+}$ and the sum of $V_f$ values. When the charging operation ends (charge end conditions will be discussed later in examples), the current sharply drops which flows in the charging constant current circuit 5. When the sharp drop of the current is detected, a detection signal will be provided. Thus, the discharging constant current circuit 4 starts operating based on the detection signal.

(Discharging Path DP)

Subsequently, the charging/discharging capacitor 3 is discharged in the period where the power supply voltage of AC power supply AP is low. A discharging current flows, as shown by the arrow in FIG. 3, so that the charging/discharging capacitor 3 is discharged with the discharging current being adjusted to a constant current by the discharging constant current circuit 4. In the case where the difference between the capacitor charging voltage $V_{c+}$ and sum of $V_f$ values is set to tens volts, it is possible to eliminate a light OFF period with appropriately suppressing the loss of the discharging constant current circuit 4, which adjusts the discharging current at a constant current. In this case, a voltage at the capacitor discharging operation end $V_{c-}$ will reach a voltage obtained by $V_{c-}=V_f$+several volts (voltage loss by the discharging constant current circuit 4), where $V_f$ is the sum of $V_f$ values of serially-connected LED devices if the LED section is composed of a plurality of LED devices, or the $V_f$ value of a single LED device if the LED section is composed of the single LED device.

(Transient Path TP)

Figure 5:
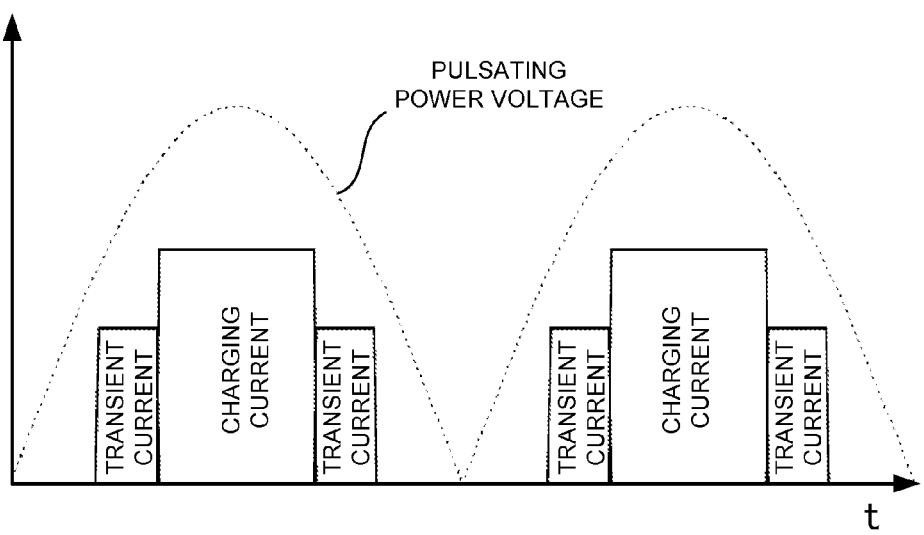
FIG. 5 is a graph showing a pulsating power voltage and a power supply current waveform according to the second embodiment.

It is noted that the power supply voltage can exceed the capacitor charging voltage $V_{c+}$ in a transition period from the charging operation to the discharging operation. A current can flow as shown by the arrow in FIG. 4 in this period. Such a current can flow in another, similar period. This similar period exists also in another transition period from the discharging operation to the charging operation (these transition periods are referred to as "transient periods"). The current flowing into LEDs in the transient period is adjusted to a lower one of the constant currents which are set in the discharging constant current circuit 4 and the charging constant current circuit 5. In this embodiment, the constant current of the discharging constant current circuit 4 is set lower. FIG. 5 shows the pulsating power voltage and the power supply current waveform. In the case where the constant current of the discharging constant current circuit 4 is set lower, the current waveform can have a waveform near a sine wave. Accordingly, the power factor can be improved. According to the test by the inventors, improvement of about 5% can be expected as compared with a conventional apparatus. Thus, the loss of the circuit can be suppressed by the capacitor charging voltage in the capacitor charging period, while the LED section can emit light even in the period where the power supply voltage is low.

In this embodiment, home power supply is used as the AC power supply so that the LED driving apparatus directly drives the LED section with the pulsating voltage which periodically varies after full-wave rectification. In the period where the pulsating power voltage is high, the LED section and the charging/discharging capacitor 3 are serially connected to each other so that the LED section emits light while the charging/discharging capacitor 3 is simultaneously charged. In the period where the pulsating power voltage is low, the charging/discharging capacitor 3 is discharged so that the LED section can emit light. On the other hand, the LED driving apparatus can have a plurality of LED sections. In this case, the combination of the plurality of LED sections can be selected which emit light depending on the capacitor charging period, the capacitor discharging period, and the transient period, which exists between the capacitor charging and discharging periods.

Second Embodiment

Figure 6:
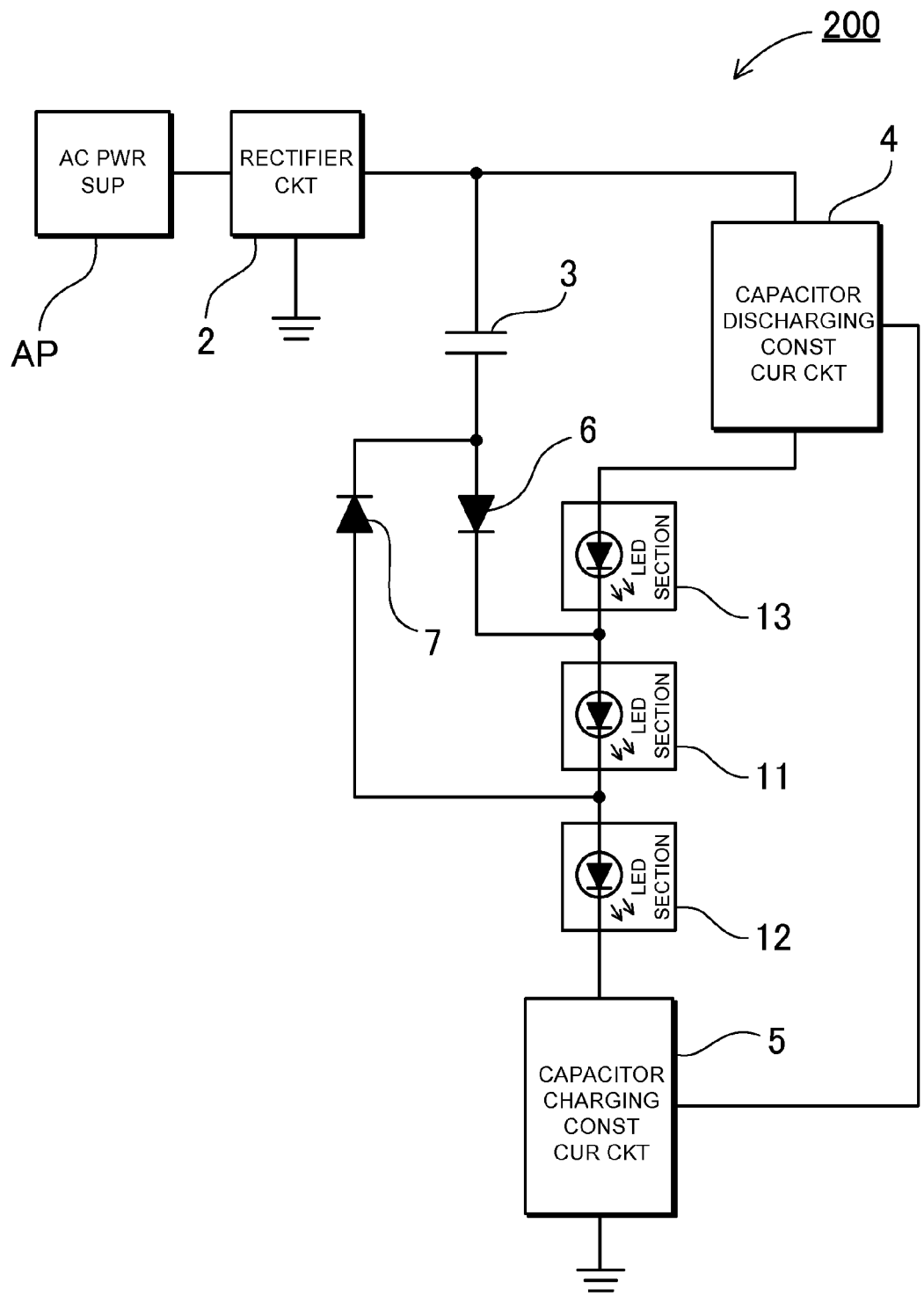
FIG. 6 is a block diagram showing a light-emitting diode driving apparatus according to the second embodiment.

Although the exemplary circuit shown in FIG. 1 includes the single LED section, a plurality of LED sections can be used. A plurality of LED sections can be serially connected to each other. In this case, an additional LED section can be connected on the charging path CP. Alternatively, an additional LED section can be connected on the discharging path DP. Alternatively, additional LED sections can be connected both on the charging and discharging paths CP and DP. FIG. 6 shows an exemplary circuit according to a second embodiment. The second and third LED sections 12 and 13 are connected on the charging and discharging paths CP and DP, respectively. As in this embodiment, the LED driving apparatus can have the LED sections. In this embodiment, the combination of LED sections (i.e., the number of LED section(s)) can be changed which emit light depending on the capacitor charging period, the capacitor discharging period, and the transient period, which exists between the capacitor charging and discharging periods. According to this construction, it is possible to further improve the power supply efficiency and to provide more higher flexibility to set the LED voltage $V_f$ values.

Under the constraints of $V_{c+}=V_{che}-Vf$, and $V_{c+}>V_f$ as shown above, the relationship $V_{che}>2V_f$ is obtained. The maximum $V_{che}$ value is 141 V (in Japan) which is the peak of the power supply voltage. Accordingly, the LED driving apparatus has the constraint of 70 V>Vf. In the current path in the transient period as shown in FIG. 4, the LED section is driven by one of the discharging and charging constant current circuits 4 and 5 which is set to a smaller constant current, in other words, the LED section is driven at the smaller constant current. Accordingly, the current path in this transient period corresponds to a conventional path with a large circuit loss. To avoid this, according to the second embodiment, the combination of LED sections are changed which emit light depending on the charging period, the discharging period, and the transient period. Thus, the loss can be reduced particularly in the transient period. As a result, the constraint of 70 V>$V_f$ can be satisfied in the charging and discharging periods in the LED driving apparatus. For this reason, $V_f$ can be set within a wide range. Therefore, it is possible to provide an LED driving apparatus which can be adjusted for various types of lighting apparatuses and the specifications of LEDs, and can serve as a lighting apparatus with high power supply efficiency.

Figure 7:
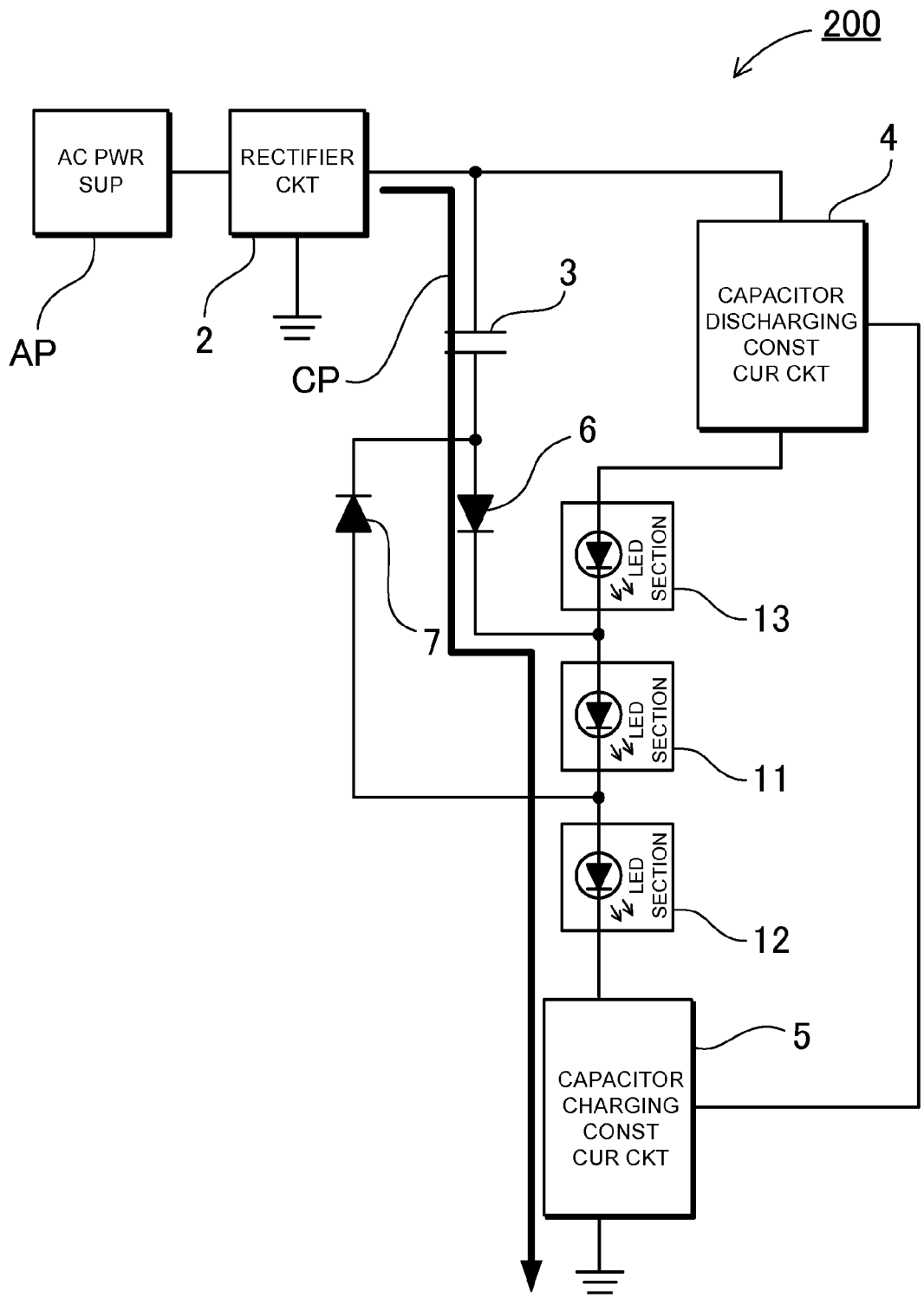
FIG. 7 is a block diagram showing a current path in a capacitor charging period in the light-emitting diode driving apparatus shown in FIG. 6.
Figure 8:
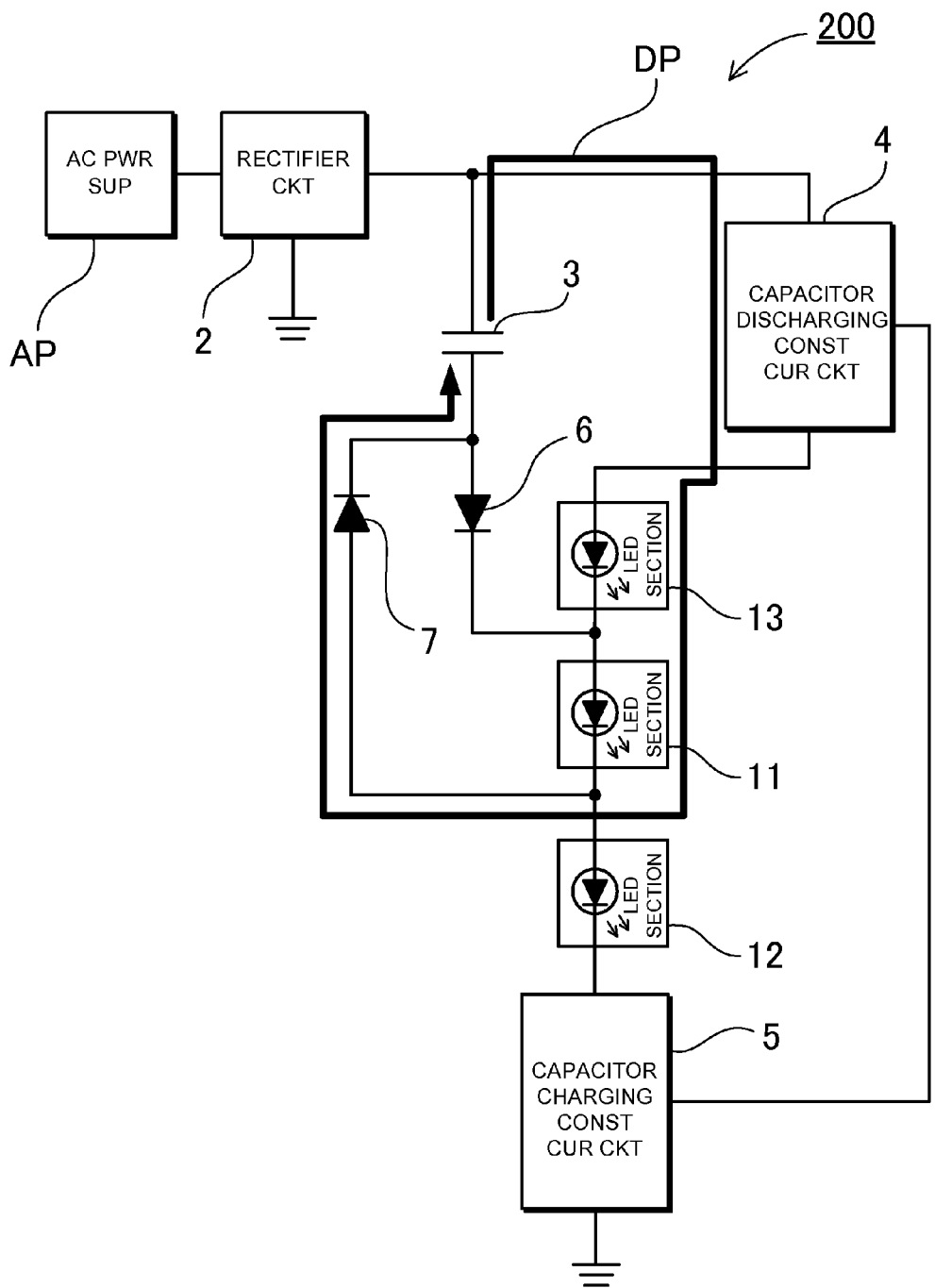
FIG. 8 is a block diagram showing a current path in a capacitor discharging period in the light-emitting diode driving apparatus shown in FIG. 6.
Figure 9:
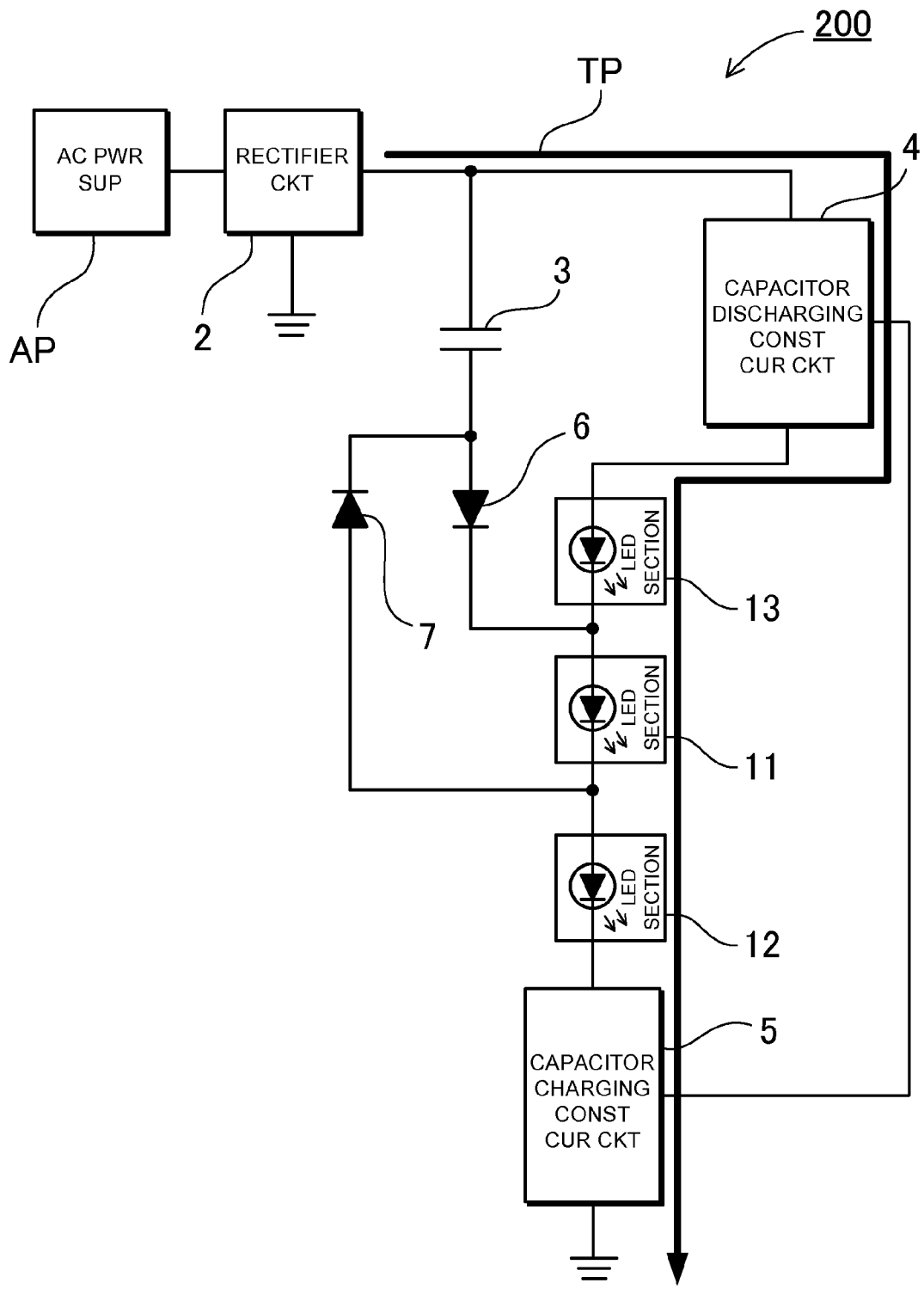
FIG. 9 is a block diagram showing a current path in a transient period in the light-emitting diode driving apparatus shown in FIG. 6.

FIGS. 7, 8, and 9 show current paths in a light-emitting diode driving apparatus 200 shown in FIG. 6 in the charging period, the discharging period, and the transient period, respectively, by the arrows similarly to the current paths in the light-emitting diode driving apparatus shown in FIG. 1. As shown in FIG. 7, in the charging period, the first and second LED sections 11 and 12 are brought ON. As shown in FIG. 8, in the discharging period, the third and first LED sections 13 and 11 are brought ON. As shown in FIG. 9, in the transient period, all of the first, second, and third LED sections 11, 12, and 13 are serially connected to each other, and brought ON. Thus, $V_f$ becomes the maximum in the transient period (i.e., the sum of $V_f$ values of first, second, and third LED sections). Accordingly, each of $V_f$ values of first, second, and third LED sections can be set irrespectively of the constraint of 70 V>Vf (in other words, the sum of $V_f$ values of first, second, and third LED sections can exceed 70 V). As a result, the loss of the constant current circuit can be reduced, while the electric power can be increased which is supplied to the LED sections. Therefore, it is possible to improve the power supply efficiency. On the other hand, the sum $V_{f12}$ of $V_f$ values of the first and second LED sections 11 and 12, and the sum $V_{f13}$ of the first and third LED sections 11 and 13 are set smaller than 70 V so that the capacitor can be charged/discharged.

Figure 10:
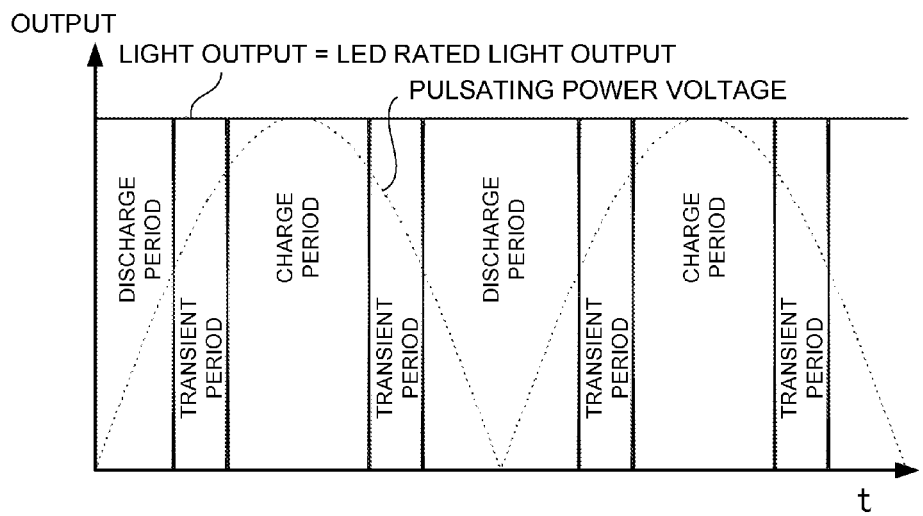
FIG. 10 is a graph showing the LED usage efficiency in case the number of LED section(s) is one.
Figure 11:
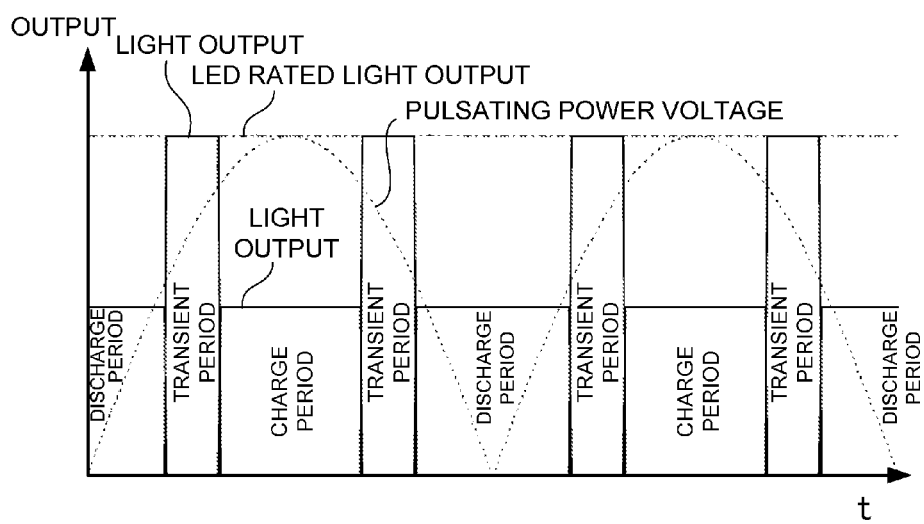
FIG. 11 is a graph showing the LED usage efficiency in case the number of LED section(s) is two.
Figure 12:
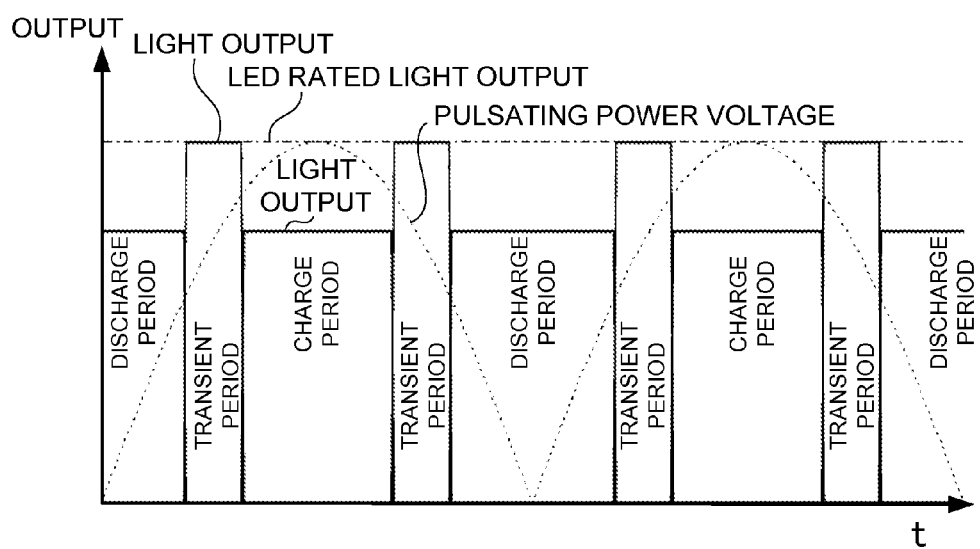
FIG. 12 is a graph showing the LED usage efficiency in case the number of LED section(s) is three.

It is preferable that an additional single LED section be connected to each of the charging and discharging paths CP and DP so that totally three LED sections are provided. FIGS. 10 to 12 show the comparison of the cases of one, two, and three LED section(s). FIGS. 10, 11, and 12 show the LED driving efficiencies of the cases of one, two, and three LED section(s). With reference to on these figures, the reason is now explained to provide three LED sections in the preferable case from viewpoint of the LED usage efficiency. For ease of explanation, it is assumed that the lengths of each of the three periods (the charging period, the discharging period, and the transient period) in these cases are same as each other, and that currents of each of the three periods are same as each other (the current is the rated current of the LED device). According to the construction of one LED section shown in FIG. 1, the only one LED section is brought ON all the time. As a result, the LED usage efficiency can be 100% (FIG. 10). In the case of two LED sections, the sum of $V_f$ Values of the two LED sections can be set 80 V. When the sum of $V_f$ Values of the two LED sections is evenly divided into the two LED sections, the $V_f$ value of each of the two LED sections is 40 V. In this case, the LED usage efficiency can be 66% (FIG. 11). In the case of three LED sections, the sum of $V_f$ Values of the three LED sections can be set 80 V. When $V_{f12}$ and $V_{f13}$ are set as $V_{f12}=60$ V, and $V_{f13}=60$ V, $V_{f1}$, $V_{f2}$ and $V_{f3}$ can be $V_{f1}=20$ V, $V_{f2}=40$ V, and $V_{f3}=20$ V. In this case, the LED usage efficiency can be 83% (FIG. 12). From this comparison, the LED usage efficiency can be more preferable in the case of three LED sections than that of two LED sections. For this reason, three LED sections are provided in the second embodiment.

On the other hand, in the case where three LED sections are provided, the number of LED sections can be increased which are serially connected to each other in the transient period than the case of one LED section. Accordingly, the voltage can be high which is applied to the LED sections. As a result, the voltage can be low which is applied to the discharging constant current circuit 4. In other words, it is possible to suppress the loss of the discharging constant current circuit 4 in the transient period. Therefore, the LED sections can efficiently emit light.

EXAMPLES

Figure 13:
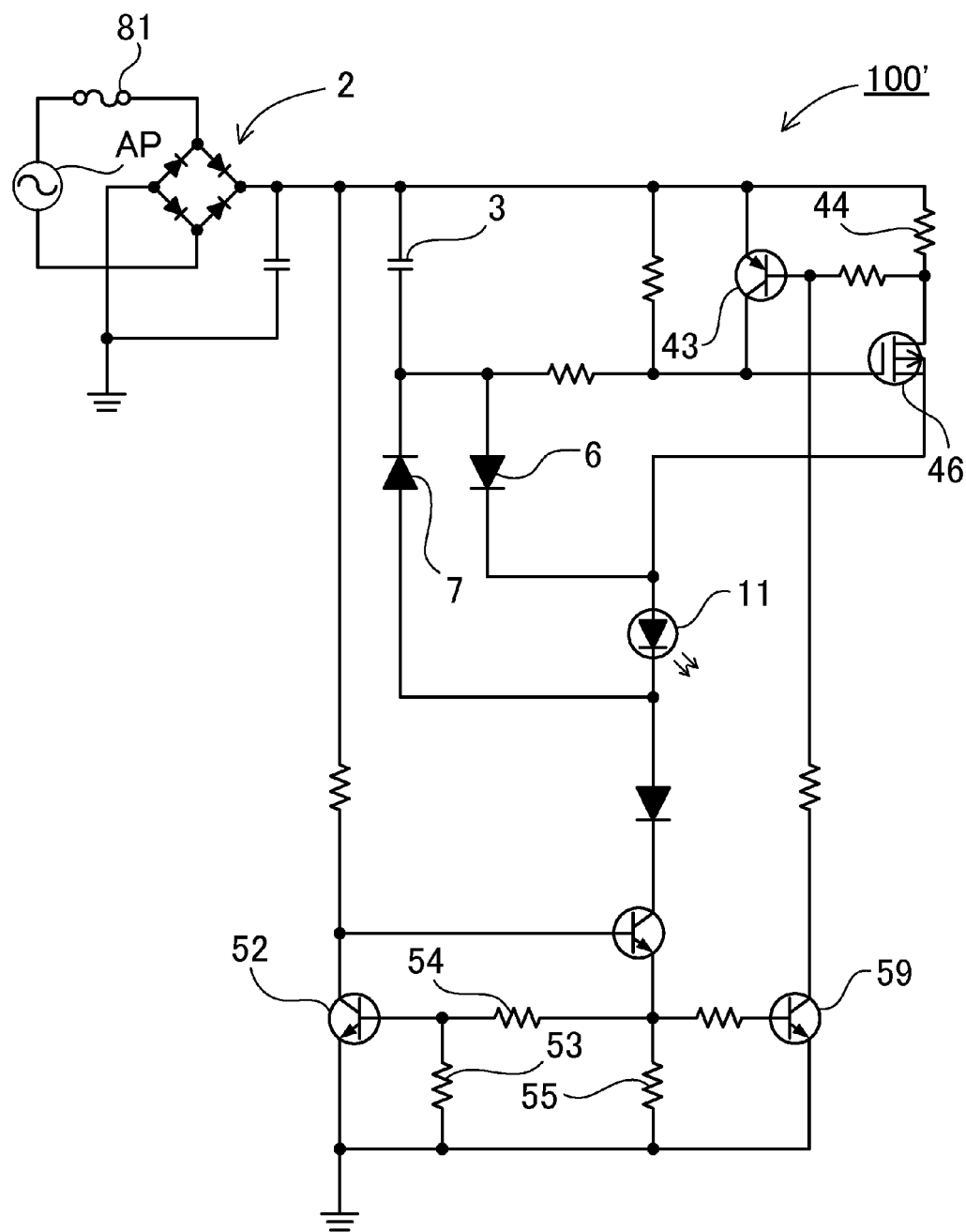
FIG. 13 is a circuit diagram showing an exemplary circuit of a light-emitting diode driving apparatus according to an example 1.
Figure 14:
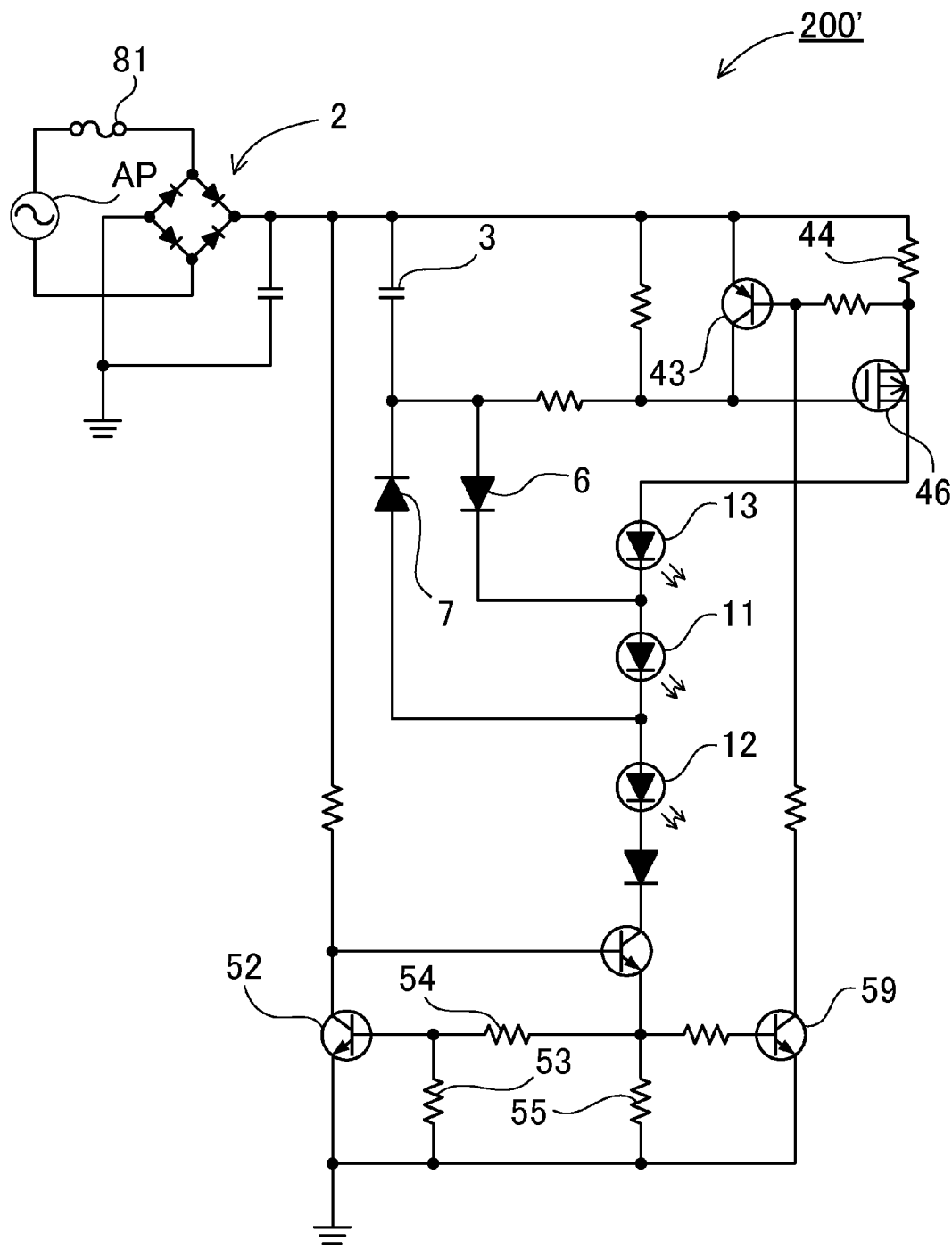
FIG. 14 is a circuit diagram showing an exemplary circuit of a light-emitting diode driving apparatus according to an example 2.
Figure 15:
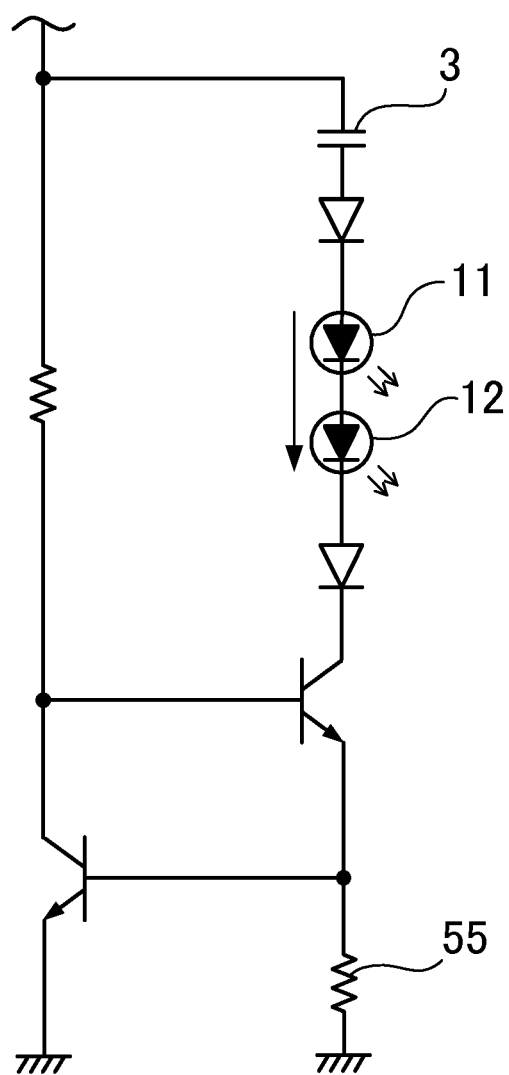
FIG. 15 is a circuit diagram showing an equivalent circuit in the charging period of the light-emitting diode driving apparatus shown in FIG. 14.
Figure 16:
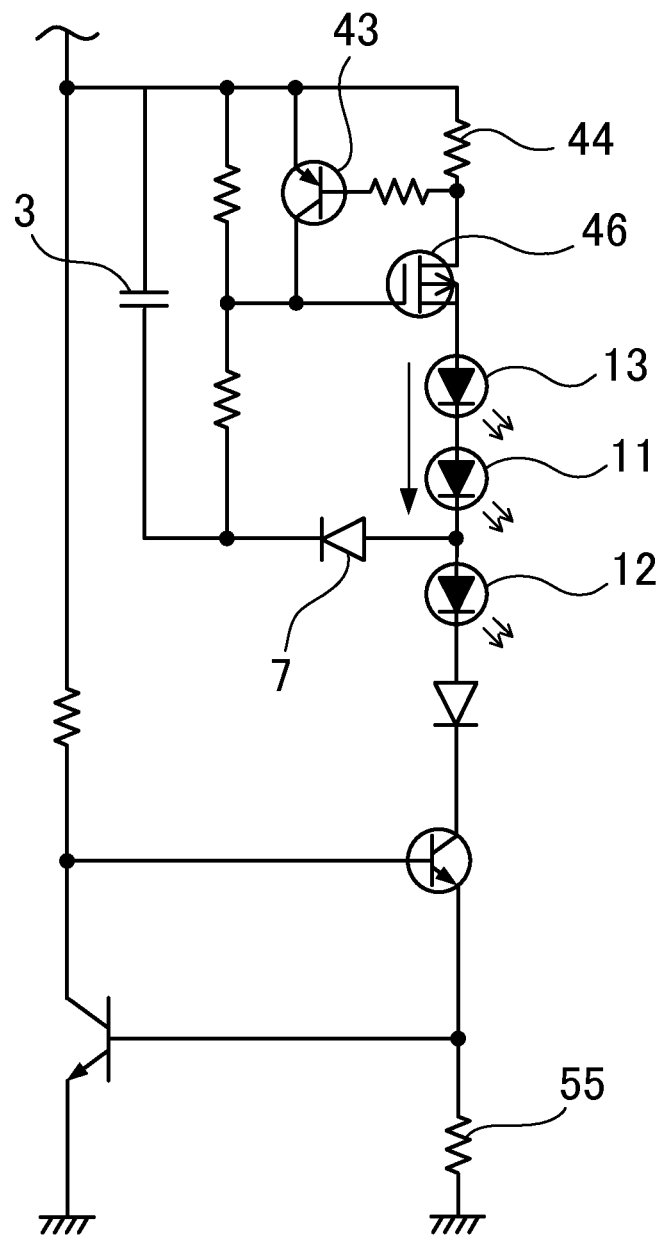
FIG. 16 is a circuit diagram showing an equivalent circuit in the transient period of the light-emitting diode driving apparatus shown in FIG. 14.
Figure 17:
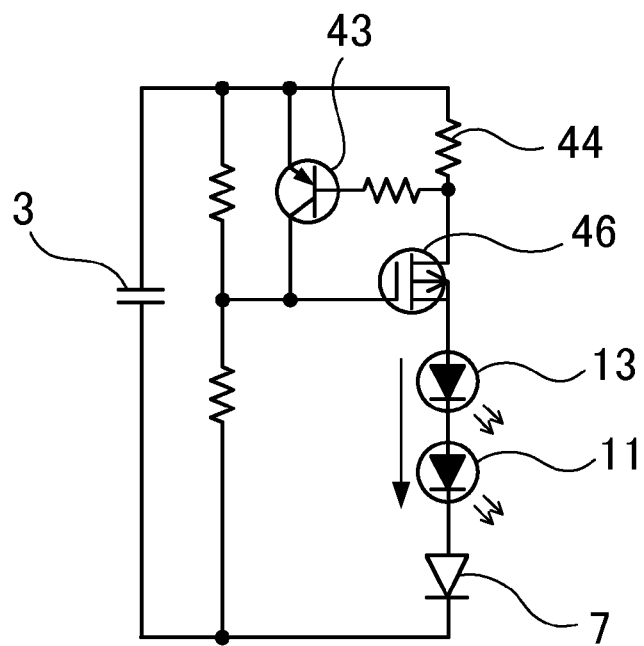
FIG. 17 is a circuit diagram showing an equivalent circuit in the discharging period of the light-emitting diode driving apparatus shown in FIG. 14.

Specifically, FIG. 13 shows an exemplary circuit of a light-emitting diode driving apparatus 100' according to an example 1 corresponding to the light-emitting diode driving apparatus 100 according to the first embodiment shown in FIG. 1. FIG. 14 shows an exemplary circuit of a light-emitting diode driving apparatus 200' according to an example 2 corresponding to the light-emitting diode driving apparatus 200 according to the second embodiment shown in FIG. 6. The exemplary circuits 100' and 200' operate basically as discussed above. The operation is now described in more detail mainly for the light-emitting diode driving apparatus 200' according to the example 2. The light-emitting diode driving apparatus 100' according to the example 1 operates substantially similarly to the light-emitting diode driving apparatus 200' according to the example 2. The first LED section 11, the second LED section 12, and the third LED section 13 in the light-emitting diode driving apparatus 200' shall be deemed to be replaced with the first LED section 11 in the light-emitting diode driving apparatus 100'. Also, $V_{f12}$, $V_{f23}$, and $V_{f123}$ in the light-emitting diode driving apparatus 200' shall be deemed to be replaced with $V_f$ in the light-emitting diode driving apparatus 100'. FIG. 15 shows an equivalent circuit in the charging period in the light-emitting diode driving apparatus 200' shown in FIG. 14. FIG. 16 shows an equivalent circuit in the transient period. FIG. 17 shows an equivalent circuit in the discharging period.

When the charging/discharging capacitor 3 is discharged, a path is formed from the charging/discharging capacitor 3 through a discharging current detection resistor 44, a discharging current control FET 46, the third LED section 13, the first LED section 11, and the discharging diode 7 back to the charging/discharging capacitor 3, as FIGS. 14 and 17. When the power supply voltage rises and exceeds the sum of terminal voltages of all of the LEDs in the first to third LED sections 11 to 13 (=$V_{f123}$), operation enters the transient phase (FIG. 16) so that all of the LED sections are driven with a current adjusted by the discharging current control FET 46.

When the power supply voltage further rises and exceeds the sum (=$V_{c-}+V_{f12}$) of the terminal voltage ($V_{c-}$) of the charging/discharging capacitor 3 and the sum ($V_{f12}$) of the terminal voltages of the first and second LED sections 11 and 12, the capacitor starts being charged. When the capacitor starts being charged, simultaneously, a charging period detection transistor 59 is turned ON, while the discharging constant current circuit 4 is turned OFF. Thus, the first and second LED sections are driven with the charging current as shown in FIG. 15. The charging current is detected by a charging current detection resistor 55. The voltage corresponding to the charging current is divided by a base resistor 54 and a base voltage dividing resistor 53 of a charging current detection control transistor 52. Thus, the charging current is set larger than the discharging current. As a result, the power factor can be improved as discussed above. The upper limit of the charging current is specified which sets the charging period long and keeps the capacitor being charged at the peak of power supply voltage. In this case, at a high voltage where the circuit loss is large, the capacitor terminal voltage can suppress the voltage. Therefore, it is possible to improve the power supply efficiency.

After the power supply voltage reaches the peak, when the power supply voltage decreases to the sum of the rising capacitor terminal voltage (rising to $V_{c+}$) and $V_{f12}$, the capacitor stops being charged. When the charging current correspondingly drops, the phase enters the transient period again. When the phase enters the transient period, simultaneously, the charging period detection transistor 59 is turned OFF, while the discharging constant current circuit 4 is turned ON. When the power supply voltage further decreases lower than $V_{f123}$, the current becomes zero which flows through the charging current detection resistor 55. Subsequently, the capacitor starts being discharged at a discharging current which is specified by the discharging current detection resistor 44. Thus, one cycle of operation ends.

Figure 18:
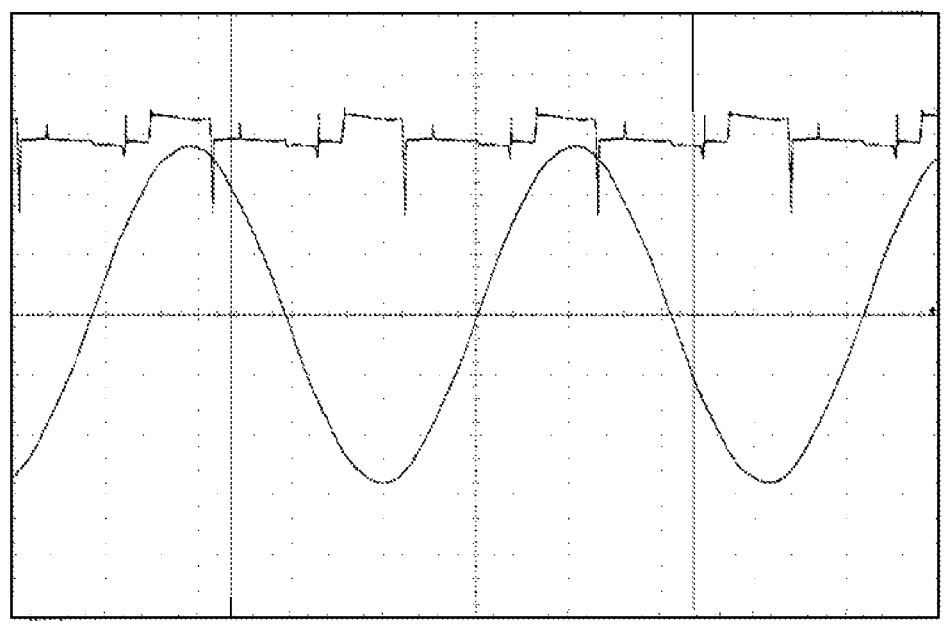
FIG. 18 is a graph showing a light output waveform of the light-emitting diode driving apparatus shown in FIG. 14.
Figure 19:
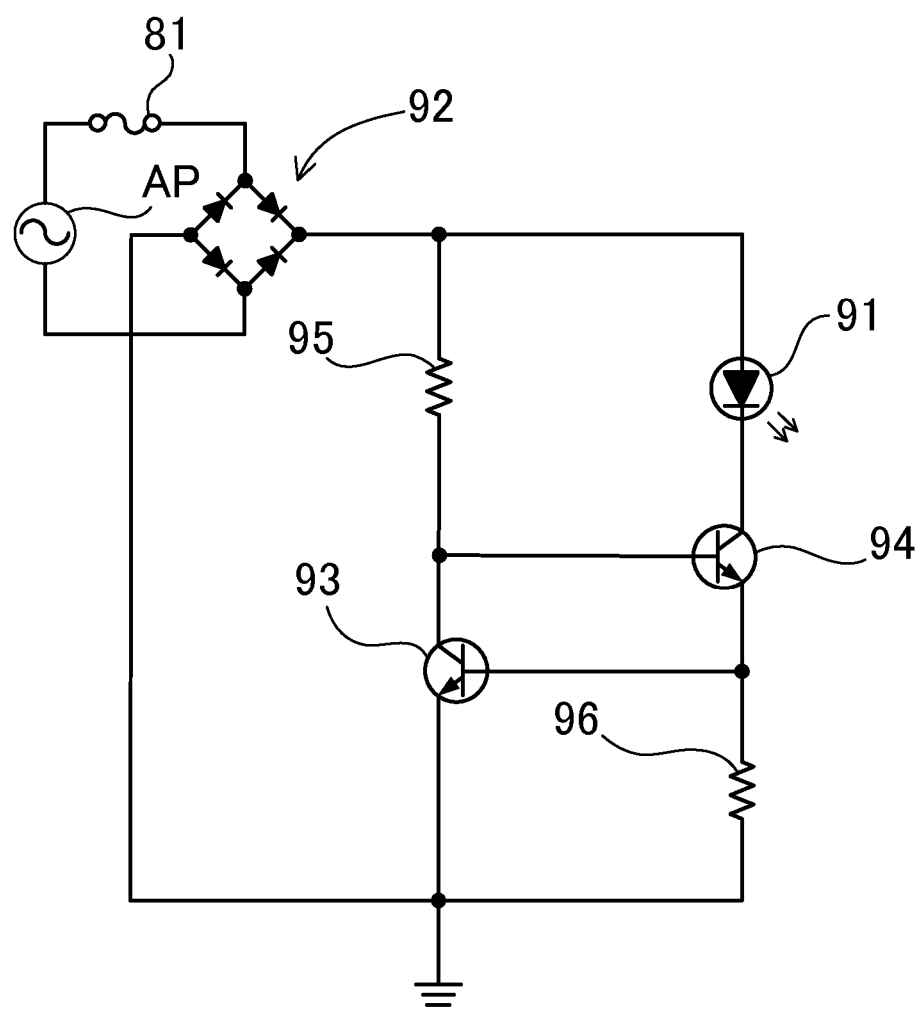
FIG. 19 is a circuit diagram showing a constant current LED driving circuit.
Figure 20:
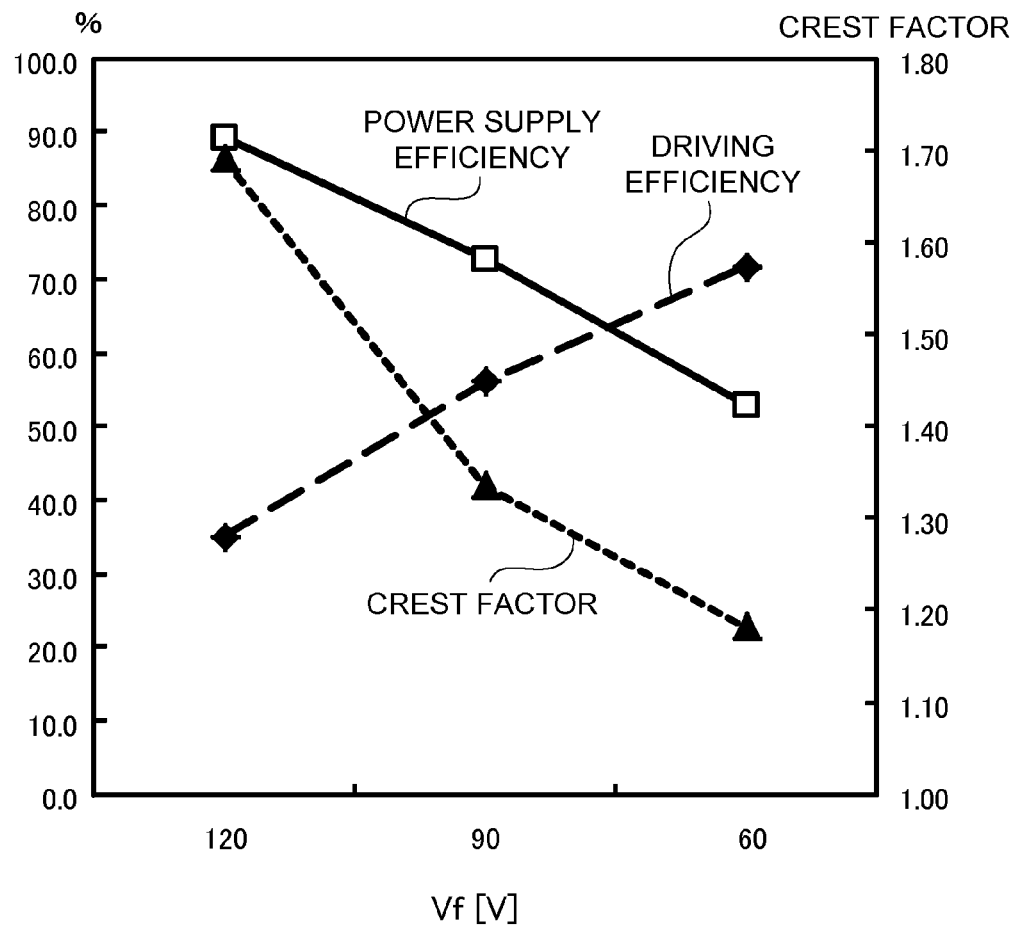
FIG. 20 is a graph showing efficiencies of the circuit shown in FIG. 19 in the case where the sum of $V_f$ values of LEDs is varied which is to be driven at a constant current.

FIG. 18 is a graph showing the light output in the example 2. According to this graph, the ratio of the lowest light output is about 60% relative to the light output at the peak in the example 2. The crest factor can be 1.15. These values are superior to fluorescent lamps. As a result, it can be seen that lighting quality is improved very much. Although the charging/discharging capacitor 3 is provided, since the capacitor charging current is controlled by the constant current circuit, an inrush current is not produced. This is advantageous particularly in the case where a large capacitance capacitor is used. Also, since the charging/discharging capacitor 3 is serially connected to the LED section, and is charged, the charging voltage can be low. As a result, a capacitor can be used which has a lower rated voltage as compared with the construction where a capacitor is directly connected between the pulsating current power supply line and GND. Since the capacitor charging/discharging current is controlled by the constant current circuit, the capacitor ripple current is very small as compared with quick charging operation. For this reason, although it is said that aluminum electrolytic capacitors have shorter life as compared with LEDs, even in the case where an aluminum electrolytic capacitor is used, it is possible to surely provide a light-emitting diode driving apparatus with long life. Therefore, it is possible to improve the product quality. It is possible to substantially reduce the number of LEDs. Accordingly, there is an advantage in cost. In addition to this, it is possible to improve the LED usage efficiency. It is possible to improve both the LED usage efficiency and the power supply efficiency, which have a tradeoff relationship with each other in conventional apparatuses. According to a graph of FIG. 20 showing efficiencies of a circuit in conventional apparatus, in the case of $V_f$=75 V, both the power supply efficiency and the LED usage efficiency are about 65%, and the crest factor is about 1.25. Contrary to this, according to a test in the example 2 of the present invention, both the power supply efficiency and the LED usage efficiency is not less than 80%, the crest factor is 1.15. In addition, it can be seen that the light OFF period is eliminated.

Industrial Applicability

The aforementioned light-emitting diode driving apparatus includes LED devices. The LED devices and the driving circuit for driving the LED devices can be mounted on a common circuit board. This light-emitting diode driving apparatus can be used as a lighting apparatus driven by AC commercial power for home use.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2011-116,389 filed in Japan on May 24, 2011, the content of which is incorporated herein by reference.

What is claimed is:

1. A light-emitting diode driving apparatus comprising:
    a rectifying circuit that can be connected to AC power supply and rectifies an AC voltage of the AC power supply to provide a rectified voltage;
    a first LED section that includes at least one LED device connected to the output-side of said rectifying circuit;
    a charging/discharging capacitor that is serially connected to said first LED section;
    a capacitor charging constant current circuit that controls a capacitor charging current so that said charging/discharging capacitor is charged at a constant current;
    a charging diode that is connected to said charging/discharging capacitor and the anode side of the first LED section, and limits the direction of the capacitor charging current;
    a capacitor discharging constant current circuit that controls a capacitor discharging current so that said charging/discharging capacitor is discharged at a constant current; and
    a discharging diode that is connected to said charging/discharging capacitor and the cathode side of the first LED section, and limits the direction of the capacitor discharging current,
    wherein a charging path is provided which includes said charging/discharging capacitor, said charging diode and said capacitor charging constant current circuit, and said charging/discharging capacitor can be charged through the charging path,
    wherein a discharging path is provided which includes said charging/discharging capacitor, said discharging diode and said capacitor discharging constant current circuit, and said charging/discharging capacitor can be discharged through the discharging path, and
    wherein a transient path is provided which does not include said charging/discharging capacitor but includes said first LED section, said capacitor charging constant current circuit and said capacitor discharging constant current circuit.

2. The light-emitting diode driving apparatus according to claim 1, wherein said charging and discharging diodes are connected to the both ends of said first LED section, wherein the charging and discharging diodes are connected in parallel to each other.

3. The light-emitting diode driving apparatus according to claim 1, wherein said charging path further includes a second LED section.

4. The light-emitting diode driving apparatus according to claim 1, wherein said discharging path further includes a third LED section.

5. The light-emitting diode driving apparatus according to claim 1, wherein charging and discharging paths further include second and third LED sections, respectively.

6. The light-emitting diode driving apparatus according to claim 3, wherein the number of LED devices which are provided on the transient path and emit light in a transient period is greater than the number of LED devices which emit light at the peak of the rectified voltage rectified by said rectifying circuit.

7. The light-emitting diode driving apparatus according to claim 1, wherein the amount of a current is smaller which is applied to LED devices which are provided on the transient path and are supplied with the current in a transient period than the amount of a current which is applied to LED devices at the peak of the rectified voltage rectified by said rectifying circuit.

* * * * *